United States Patent
Otto et al.

(10) Patent No.: US 11,579,628 B2
(45) Date of Patent: Feb. 14, 2023

(54) METHOD FOR LOCALIZING A VEHICLE

(71) Applicant: Visteon Global Technologies, Inc., Van Buren Township, MI (US)

(72) Inventors: Mathias Otto, Pfinztal-Söllingen (DE); Martin Pfeifle, Seewald (DE); Hendrick Bock, Zeiskam (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 238 days.

(21) Appl. No.: 16/783,121

(22) Filed: Feb. 5, 2020

(65) Prior Publication Data

US 2020/0249695 A1    Aug. 6, 2020

(30) Foreign Application Priority Data

Feb. 5, 2019    (EP) .................................. 19155487

(51) Int. Cl.
*G05D 1/02*    (2020.01)
*G01C 21/30*    (2006.01)
*G05D 1/00*    (2006.01)

(52) U.S. Cl.
CPC ........... *G05D 1/0285* (2013.01); *G01C 21/30* (2013.01); *G05D 1/0088* (2013.01); *G05D 1/0274* (2013.01); *G05D 1/0278* (2013.01); *G05D 1/0242* (2013.01); *G05D 1/0257* (2013.01); *G05D 2201/0213* (2013.01)

(58) Field of Classification Search
CPC .. G05D 1/0285; G05D 1/0088; G05D 1/0274; G05D 1/0278; G05D 1/0242; G05D 1/0257; G05D 2201/0213; G05D 1/027; G05D 1/0212; G05D 2201/0207; G01C 21/30; G01C 21/005; G01C 21/32; G01C 21/3815
USPC ....... 701/300, 495, 408, 446, 532, 468, 469; 342/357.64, 357.33, 450, 462
See application file for complete search history.

(56) References Cited

U.S. PATENT DOCUMENTS

| | | | |
|---|---|---|---|
| 10,429,487 B1 * | 10/2019 | Fowe | G01S 19/12 |
| 2005/0203677 A1 * | 9/2005 | Auger | G01C 21/34 |
| | | | 701/16 |
| 2016/0069690 A1 * | 3/2016 | Li | G01S 19/49 |
| | | | 701/412 |

(Continued)

FOREIGN PATENT DOCUMENTS

WO    2018104563 A2    6/2018

OTHER PUBLICATIONS

European Search Report from the European Patent Office for related European Application No. 19155487.2 dated Aug. 9, 2019, 8 pages.

*Primary Examiner* — Dalena Tran
(74) *Attorney, Agent, or Firm* — Quinn IP Law

(57) ABSTRACT

A method for localizing a vehicle comprises transmitting first position data related to a first position of the vehicle at a first point in time from the vehicle to a server. The server computes second position data related to the first position of the vehicle at the first point in time based on the received first position data. The server transmits the second position data from the server to the vehicle. The vehicle computes third position data related to a second position of the vehicle at a second point in time based on the received second position data. The second point in time is later than the first point in time.

20 Claims, 3 Drawing Sheets

(56) References Cited

U.S. PATENT DOCUMENTS

2017/0176998 A1    6/2017  Fechner et al.
2020/0200547 A1*  6/2020  Miller .............. G08G 1/096805

\* cited by examiner

METHOD FOR LOCALIZING A VEHICLE

CROSS-REFERENCES TO RELATED APPLICATIONS

This patent application claims priority to European Patent Application Serial No. 19155487.2, filed Feb. 5, 2019, which is incorporated herein by reference in its entirety.

TECHNICAL FIELD

One or more embodiments described herein relate to a method and a system for localizing a vehicle. In particular one or more embodiments related to a method and a system for determining the position of an autonomous motor vehicle with regard to a high-definition map are presented.

BACKGROUND

In order to safely navigate and steer an autonomous vehicle, it is important to precisely locate the position of the vehicle. Highly accurate positioning is a complex task and requires to match the measured position of the vehicle with a digital map. For this purpose, a high-definition (HD) map is generally used, which can be provided for example by a cloud to which the vehicle can connect via a network such as a mobile data network.

The process of producing an HD map is complex and involves many steps including raw data processing, point cloud production, point cloud alignment, generation of a 2D map, HD map labelling, and generation of the final map. Once the HD map has been built, the vehicle needs to be located against the HD map, preferably in real-time.

An HD map for autonomous vehicles generally has to face three critical challenges. First, the map needs to be very precise, typically with a precision on the level of centimeters. Second, it is crucial that the map be continuously updated in order to reflect changes on the roads. Typically, the HD map needs to be updated at least about once per week. Third, the HD map needs to work seamlessly with the autonomous driving system of the vehicle.

Raw data for HD map generation can be obtained in numerous different ways using sensors provided in vehicles. Fresh data can be obtained for example by crowd-sourcing sensor data or by using a dedicated fleet of survey vehicles. A seamless interaction between the HD map and the autonomous vehicle can be achieved for example by using a cloud infrastructure to provide real-time HD map updates to autonomous vehicles.

Matching the position of the vehicle on the HD map requires a relatively high computational effort. Furthermore, a large of amount of data related to the HD map needs to be transferred to the vehicle. Thus, a high bandwidth is needed for the transmission of map data. Another method of precisely localizing the position of a vehicle involves high precision inertial measurement units (IMU) in combination with position data from a global navigation satellite system (GNSS) such as the global positioning system (GPS) or GLONASS. However, such IMUs can be very expensive.

BRIEF SUMMARY OF THE INVENTION

In order to solve the problems of the conventional prediction methods described above, it is proposed to provide an improved method for localizing a vehicle.

According to an aspect, a method for localizing a vehicle comprises a step of transmitting first position data related to a first position of the vehicle at a first point in time from the vehicle to a server. The first position data can comprise a plurality of data items related to position information including coordinates and/or an orientation of the vehicle obtained from a global navigation satellite system (GNSS) and/or localization objects detected in a vicinity of the vehicle and/or accuracy information describing the uncertainty of the position information and/or a time stamp related to the (first) point in time associated with the position information. In particular, the accuracy of the first position data can be relatively low. For example, a GNSS coordinates may be received by a GPS (global positioning system) receiver, which may deliver position information of the vehicle with an uncertainty of about ten to fifteen meters, which is too inaccurate for autonomous driving. In order to increase the accuracy of the position information, the position of the vehicle may be determined more precisely by comparing objects detected in the vicinity around the vehicle with objects on a digital map.

The first position data can be transmitted to the server using a communication network such as a mobile network or cellular network. Since the amount of data included in the first position data may be relatively small, a low bandwidth may be sufficient for transmitting the position data from the vehicle to the server. It can thus be possible to use widely available mobile or cellular networks.

According to an aspect, the method comprises a step of computing, by the server, second position data related to the first position of the vehicle at the first point in time based on the received first position data. The location accuracy of the second position data is much higher than that of the first position data. In particular, the uncertainty of the second position data is on a level which is sufficient for autonomous driving, for example a few centimeters up to about ten to fifteen centimeters. On the other hand, the computational effort of computing the second position data may be relatively high. Therefore it is advantageous to carry out these calculations at a server, where available resources and computational power is not limited by boundary conditions found in a vehicle. Another advantage of outsourcing the computation of the second position data to a server is that local processing resources of the vehicle can be used for other tasks, such as controlling and steering the vehicle, planning a trajectory, and/or detecting localization objects in the vicinity of the vehicle. The second position data can be computed for example by matching the first position data with a high-definition map stored at the server.

According to an aspect, the method comprises a step of transmitting the second position data from the server to the vehicle. This step can occur via the same network as the step of transmitting the first position data from the vehicle to the server. Since the second position data can have a relatively small size, a low transmission bandwidth may be sufficient, such that low-bandwidth data transmission protocols can be utilized.

According to an aspect, the method comprises a step of computing, by the vehicle, third position data related to a second position of the vehicle at a second point in time based on the received second position data, wherein the second point in time is later than the first point in time. The third position data may describe the actual current position of the vehicle. Accordingly, the second point in time can be the present point in time. After receiving the second position data from the server, the vehicle uses the received second position data to update the relatively inaccurate first position data with the highly accurate second position data. Thus, the available information about the vehicle's position at the first point in time can be improved. Using the now available second position data, the third position data for the second point in time can be computed. Thus, the vehicle can improve the accuracy of determining its own location at the current second point in time using the second position data of the past first point in time.

According to an aspect, the server stores a high-definition (HD) map for computing the second position data. This centrally stored HD map can be updated continuously or periodically in order to maintain a realistic digital map of the real world. Updating the HD map would be a far more difficult task if the HD map were to be stored locally at the vehicle. Furthermore, an HD map comprises a high level of detail and therefore requires a large storage space, which can be made available at a server but is limited in a local computing system in a vehicle. Even if only relevant parts of an HD map of the current surrounding of the vehicle were to be stored locally in the vehicle, a large amount of data would need to be transmitted to the vehicle. Such a process usually requires a high transmission bandwidth or a relatively long transmission time. Moreover, updating the HD map locally at the vehicle would not only require large local storage space and the transfer of large amounts of data. The update would also have to be carried out for a plurality of vehicles which require the HD map.

According to an aspect, the vehicle generates the first position data based on position data obtained from a global navigation satellite system (GNSS) and/or sensor data obtained from sensors detecting a plurality of localization objects around the vehicle. For example, a GPS receiver may be used for receiving GPS coordinates. Alternatively or additionally other GNSS systems may be used for receiving location coordinates. For example the Russian Global Navigation Satellite System (GLONASS) and/or the European Galileo system may be used. As mentioned above, the accuracy of the received coordinates may amount to about ten to fifteen meters which may not be accurate enough for autonomous driving.

According to an aspect, the vehicle may obtain sensor data from a plurality of sensors detecting a plurality of localization objects around the vehicle. Suitable localization objects may include classified basic geometries which are measured in relation to the vehicle such as, for example, at least one of the following but not limited to: lane markings of roads (road surface markings), traffic signs, traffic signals, buildings, landmarks, bridges, guardrails, pillars, street lights, or any other suitable object located in a vicinity of the vehicle's trajectory.

According to an aspect, the first position data comprises uncertainty information related to the uncertainty of the position of the vehicle at the first point in time. The uncertainty information may be described in terms of an area or a radius, for example of a circle or ellipse, in which the location of the vehicle according to the first position data is contained. Alternatively, the uncertainty information may be derived from a Gaussian distribution of the positional data. For example, if the first position data comprises GNSS coordinates, the uncertainty information comprised in the first position data may indicate the location accuracy of the GNSS coordinates. As mentioned above, GNSS coordinates may have an uncertainty of several meters, for example ten to fifteen meters. Furthermore, the uncertainty information may describe the accuracy of the time stamp and/or of the positions of the detected localization objects comprised in the first position data.

According to another aspect, the third position data is calculated by taking into account a motion of the vehicle between the first point in time and the second point in time. Since the vehicle may have moved from the position associated to the second position data when receiving the second position data, the actual current position needs to be calculated using information related to the vehicle's movement. The motion of the vehicle can be described by a plurality of parameters which may be measured using a plurality of sensors. For example, the movement of the vehicle may be detected using the same sensors which generated the first position data. Furthermore, operational parameters of the vehicle can be recorded including, for example, at least one of: a speed of the vehicle, a heading of the vehicle, a steering angle of the vehicle, and a count of rotations of a wheel of the vehicle. On the other hand, if the vehicle has not been moving between the first point in time and the second point in time, the second position data may be adopted as the actual current position of the vehicle without the need to calculate third position data.

According to an aspect, the method comprises a step of generating fourth position data related to a third position of the vehicle at a third point in time, wherein the third point in time is later than the second point in time. In particular, this step of the method may be carried out at the third point in time after the second point in time. Thus, the vehicle may calculate its own position using the last known position. However, each time a new position is calculated, the uncertainty of the current position may increase. Thus, after a predetermined time interval, a past position of the vehicle may be corrected using second position data computed by and received from the server. For example, the vehicle may calculate its own position at least once every second or at least ten times every second. The repetition rate may depend for example on the speed of the vehicle or on the trajectory of the vehicle. In other words, each time the vehicle calculates its own position, the last known position is used as input. This iterative process can be continued either until the uncertainty of the current position becomes too large, for example larger than a predetermined threshold, or until a predetermined time interval has passed.

According to an aspect, the steps for obtaining the first position data, the second position data, and the third position data are carried out at predetermined, recurring time intervals. The time interval may depend on the vehicle's motion or on the uncertainty of the first position data. For example, the vehicle may send first position data to the server every ten, every twenty, or every thirty seconds or more and subsequently receive the second position data for improving the accuracy of the current location.

According to an aspect, the interval may depend on road geometry. For example, if a road the vehicle is currently travelling on has very few turns (for example a highway which has many straight sections), the required location accuracy may be low, and thus, the time interval for computing second position data by the server may be long, for example thirty second or even one or two minutes. On the other hand, when the vehicle is travelling on a road with a high number of turns (for example a mountain road), the required location accuracy may be high, and thus, the time interval for computing second position data by the server may be short, for example a few seconds up to about thirty seconds.

According to an aspect, the method comprises a step of determining a time delay between the step of transmitting the first position data from the vehicle to the server and the step of transmitting the second position data from the server to the vehicle, wherein the third position data is computed based on the determined time delay. In other words, when the vehicle receives the accurate second position data, an amount of time will have passed. If the vehicle is moving, the second position data does not describe the actual current position. In order to correctly determine the present location of the vehicle, the amount of time which has passed since the first point in time needs to be considered. The time delay may be influenced mainly by the time it takes to transmit position data between the vehicle and the server and the computation step carried out by the server.

According to an aspect, the method comprises a step of recording operational parameters of the vehicle, wherein the operational parameters which are recorded after transmitting the first position data to the server is used to compute the third position data. The operational parameters may include for example at least one of: a speed of the vehicle, a heading of the vehicle, a steering angle of the vehicle, and/or a count of rotations of a wheel of the vehicle. Since the operational parameters recorded after the first point in time may describe the motion of the vehicle after the first point in time, they may be used in order to determine the position of the vehicle after the first point in time, for example at the second or third point in time.

In the following, a system for localizing a vehicle is described. In particular, the system for localizing a vehicle is configured to execute a method for localizing a vehicle according to at least one of the aspects described above.

According to an aspect, a system for localizing a vehicle comprises a server comprising a first communication unit for receiving and sending position data from and to the vehicle, a first processing unit for computing position data, and a first storage unit for storing a high-definition (HD) map.

According to an aspect, the system for localizing a vehicle comprises a positioning device arranged in the vehicle. The positioning device may comprise a localization unit for determining first position data related to a first position of the vehicle at a first point in time, a second communication unit for transmitting the first position data from the vehicle to the server and for receiving position data from the server, and a second processing unit for computing position data.

According to an aspect, the first processing unit may be configured for computing second position data related to the first position of the vehicle at the first point in time based on the first position data. The first processing unit may comprise one or multiple central processing units (CPU). For example, the server may be embodied as a cloud, such that the first processing unit is not embodied at a single physical location but as a sum of a plurality of computers connected by a network.

According to another aspect, the first communication unit may be configured for transmitting the second position data from the server to the vehicle. For example, the first communication unit may be embodied as a network interface.

According to an aspect, the second processing unit may be configured for computing third position data related to a second position of the vehicle at a second point in time based on the second position data, wherein the second point in time is later than the first point in time.

According to an aspect, the localization unit may comprise a GPS receiver for receiving position data from a global navigation satellite system (GNSS) and/or at least one position sensor for generating sensor data by detecting a plurality of localization objects around the vehicle. In particular, the at least one position sensor may include at least one of: a radar sensor, an infrared sensor, a stereo-camera, a LiDAR sensor, and a laser sensor. In certain embodiments, a combination of sensors may be used which allows for a reliable detection of localization objects in a plurality of different weather and lighting conditions.

According to an aspect, the localization unit may further comprise a storage unit for recording operational parameters of the vehicle obtained by a plurality of sensors. The plurality of sensors may include at least one of: an accelerometer, an odometer, a tachometer, a speedometer, a wheel speed sensor, a sensor for measuring a steering angle, a sensor for measuring a heading indicator (such as a gyroscope), and/or a compass.

According to an aspect, the vehicle may be an autonomous motor vehicle comprising a control device configured for steering and navigating a trajectory of the vehicle based on at least the third position data.

According to an aspect, the second communication unit may be configured for determining a time delay related to the transmission of second position data from the server to the vehicle.

DETAILED DESCRIPTION OF THE INVENTION

Figure 1:
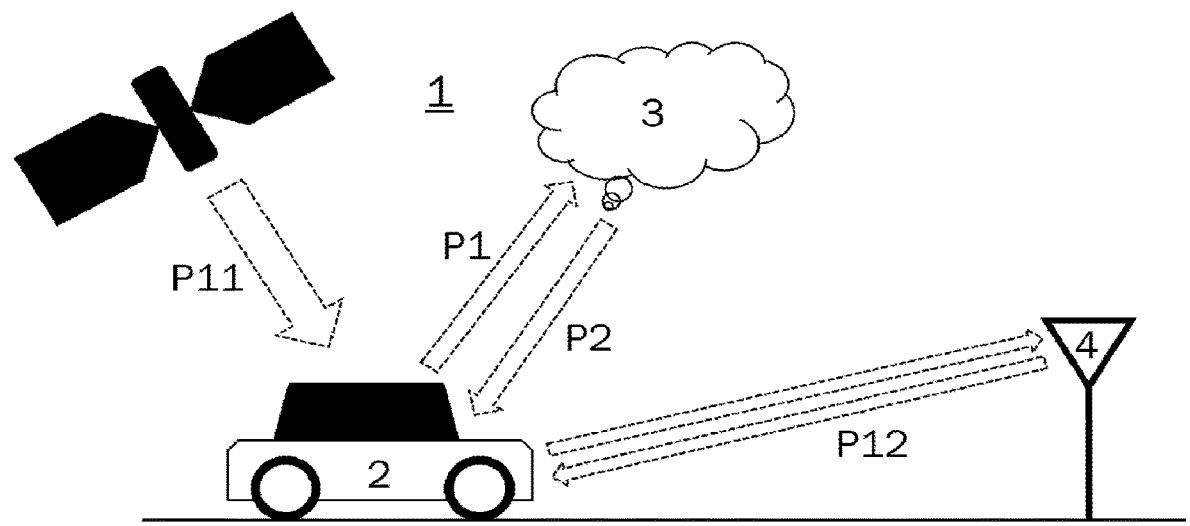
FIG. 1 schematically illustrates a system for localizing a vehicle according to an embodiment.

FIG. 1 schematically illustrates a system 1 for localizing a vehicle 2. The system 1 comprises a server 3 and a positioning device arranged in a motor vehicle 2. The server 3 may include any suitable server or computing device and may be located remotely from the vehicle 2 (e.g., in a cloud computing system or other suitable server or server system remotely located from the vehicle 2). The vehicle 2 has a control system for autonomous driving. The vehicle 2 can be described as a client to the server 3 which functions as a host serving a plurality of clients. The server 3 may be implemented in a cloud. Thus, the hardware associated with the server 3 does not need to be localized at a single physical location. The term server 3 rather describes the functional aspect of providing a data processing service which can be accessed by the clients via a network.

The server 3 comprises a first communication unit for receiving position data from the vehicle 2 and for sending position data calculated by the server 3 back to the vehicle 2. In particular, the first communication unit communicates with a second communication unit arranged in the vehicle. Data transfer between the first and second communication units can take place via a wireless network such as a mobile network or cellular network. As used herein, the term unit may refer to a controller, processor, or other suitable processing device or component. For example, the first communication unit include any suitable processor such as those descried herein and may be in communication with a memory. The memory may include Random Access Memory (RAM), a Read-Only Memory (ROM), or a combination thereof. The memory may store programs, utilities, or processes to be executed in by the processor. The memory may provide volatile data storage, and stores instructions related to the operation of the computing device. The memory may include instructions that, when executed by the processor, cause the processor to, at least, perform the methods and/or the functions of the systems described herein.

The server 3 comprises a first processing unit for computing position data. The first processing unit may be implemented as one or more CPUs. On the other hand, the first processing unit may be provided by a cloud computing system accessible via the network.

Furthermore, the server 3 comprises a first storage unit for storing a high-definition (HD) map. The first storage unit may be implemented as a database server. In some embodiments, the database storing the HD map may be provided by a separate service provider. One advantage of storing the HD map in a database accessible via a network is that updates of the HD map may be carried out centrally such that a local update of the HD map does not need to be carried out for each client.

The vehicle comprises a positioning device with a localization unit for determining position data related to the position of the vehicle 2, the second communication unit for transmitting position data from the vehicle 2 to the server 3, and a second processing unit for computing position data.

In particular, the localization unit determines first position data P1 related to a first position of the vehicle 2 at a first point in time T1 and transmits the first position data P1 to the server 3 by means of the second communication unit via the network. The first position data P1 may comprise position coordinates P11 received from a global navigation satellite system as illustrated in FIG. 1 by the satellite and/or detected positions P12 of localization objects 4 around the vehicle. Furthermore, the first position data P1 includes information related to the uncertainty of the position data and a time stamp related to the first point in time T1. The information included in the first position data P1 may have a low complexity, and thus, the associated data packets may have a small size. Therefore, the transmission of the first position data P1 may require only a relatively low bandwidth.

Figure 2:
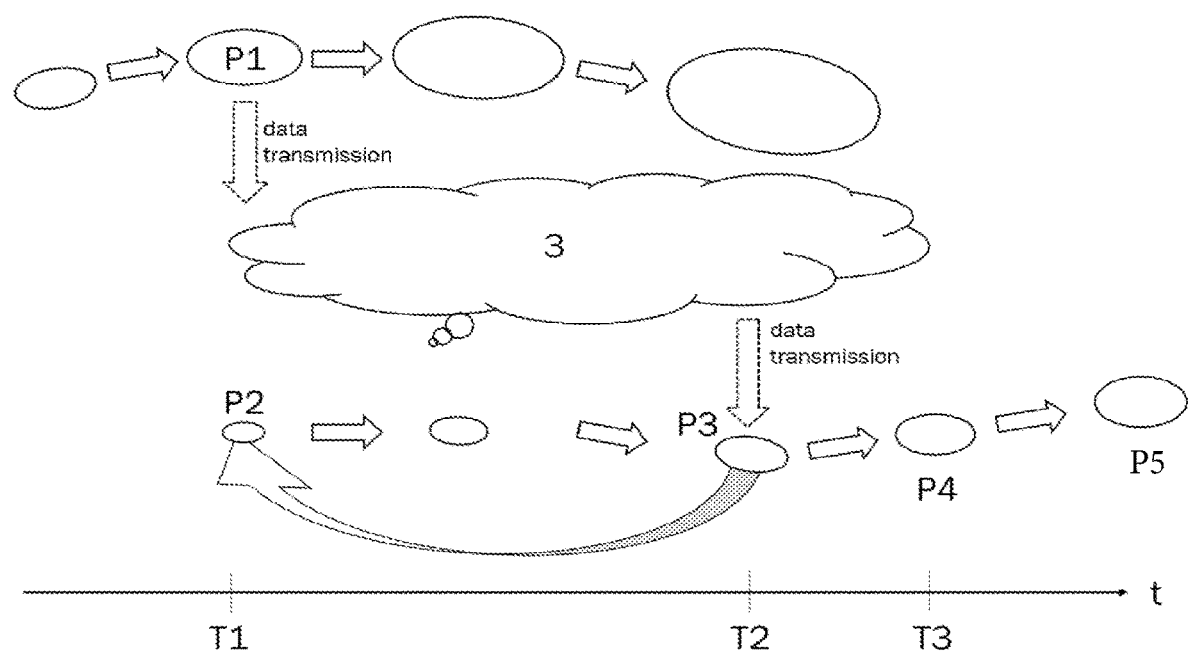
FIG. 2 schematically illustrates a method for localizing a vehicle according to an embodiment.

An example of a process associated with localizing the vehicle is illustrated by FIG. 2. A time axis is indicated by the axis labelled t at the bottom of FIG. 2. Data transmission between the vehicle 2 and the server 3 is indicated by the vertically drawn dashed arrows. A first dashed arrow indicates that the first position data P1 is sent from the vehicle 2 to the server 3. A second dashed arrow indicates that second position data P2 is sent from the server 3 to the vehicle. The ellipses illustrate the vehicle's position, wherein the size of the ellipse is meant to indicate an uncertainty of the position. The server 3 is illustrated as a cloud in the center of the figure. The ellipses depicted in the top part of FIG. 2 above the cloud indicate the positions of the vehicle 2 as determined by the vehicle 2 using locally available data. The ellipses depicted in the bottom part of FIG. 2 below the cloud indicate the positions of the vehicle 2 as determined by the vehicle 2 using locally available data and high-accuracy position data computed by the server 3.

The second communication unit transmits the first position data P1 from the vehicle 2 to the server 3 as indicated by the first dashed arrow at T1. The first communication unit receives the first position data P1 and the first processing unit of the server 3 computes second position data P2 related to the first position of the vehicle 2 at the first point in time T1 based on the first position data P1. For example, the second position data P2 may be calculated by applying an algorithm for matching detected positions P12 of localization objects 4 with the HD map. The second position data P2 is highly accurate and has a much smaller uncertainty than the first position data P1 which is indicated in FIG. 2 by the smaller ellipse.

The first communication unit transmits the second position data P2 to the vehicle 2 as illustrated by the second dashed arrow at T2. Since the received second position data P2 relates to the first point in time T1, which is in the past, the second processing unit updates the location of the vehicle previously determined as the first position data P1 by using the more accurate second position data P2 received from the server 3. This process of updating a past location of the vehicle 2 is illustrated by the curved arrow. As can be seen from FIG. 2, the size of the ellipse denoted P2 is much smaller than the size of the ellipse denoted P1, meaning that the past location of the vehicle 2 at T1 is updated with a much more accurate location. The second processing unit of the vehicle 2 may then compute third position data P3 related to a current position of the vehicle 2 at a second point in time T2 based on the second position data P2. For the calculation of the third position data P3, vehicle-internal measurements generated between the first point in time T1 and the second point in time T2 may be re-applied to the second position data P2. The second point in time T2 may be the present point in time and is therefore later than the first point in time T1.

The localization unit comprises a GPS receiver for receiving position data P11 from a global navigation satellite system (GNSS). The GPS receiver can obtain position data P11 with an accuracy of about ten to fifteen meters.

Furthermore, the localization unit receives sensor signals from an accelerometer, a gyroscope, and wheel speed sensor. Furthermore, the localization unit comprises position sensors for generating sensor data P12 by detecting a plurality of localization objects 4 such as pylons, traffic signs, guiderails, lane markings on the road, and/or buildings around the vehicle 2. The position sensors may include for example a stereo camera, a LiDAR, and a radar.

Furthermore, the second processing unit of the vehicle 2 can compute fourth position data P4 related to a third position of the vehicle at a third point in time T3. As illustrated in FIG. 2, the third point in time T3 is later than the second point in time T2. In other words, the second processing unit of the vehicle 2 may continue to compute a current position of the vehicle 2 based on the previously calculated location. This process may be repeated periodically as indicated by the ellipse P5 next to the ellipse denoted P4 as time continues. Thus, the vehicle 2 may calculate its own position using the last known position. For example, after fourth position data P4, fifth position data, sixth position, and so forth may be calculated. However, each time a new position is calculated, the uncertainty of the current position may increase such that the uncertainty of the position data at P5 is greater than the uncertainty of the position data at P4, which is greater than the uncertainty of the position data at P3, which is greater than the uncertainty of the position data at P2 as illustrated by the increasing size of the ellipses in FIG. 2 from P2 to P5. For example, the vehicle 2 may calculate its own position at least once every second or at least ten times every second. The repetition rate may depend, for example, on the speed of the vehicle 2 or on the trajectory of the vehicle 2. In particular, the repetition rate for calculating the current position of the vehicle 2 is much smaller than the time interval for transmitting position data to the server 3 for obtaining highly accurate position information.

FIG. 2 also illustrates a comparison of the accuracy of the location information. The top part of FIG. 2 shows how the accuracy of the location would develop without receiving highly accurate location information from the server 3. For example, the ellipse above the cloud at time T2 is much larger than the ellipse denoted P3 at T2 below the cloud.

Figure 3:
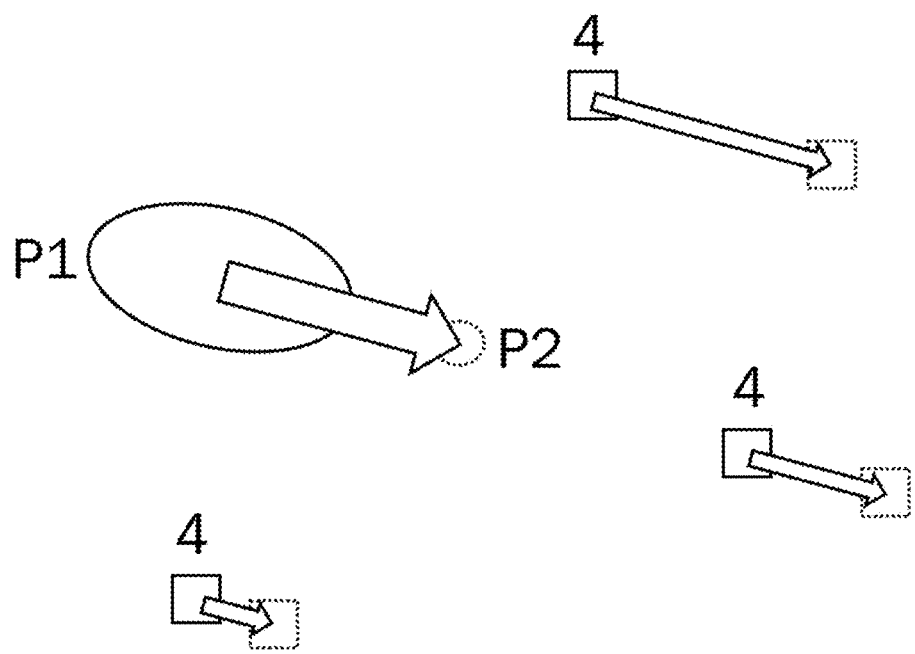
FIG. 3 schematically illustrates a first example of detecting localization objects for localizing a vehicle.
Figure 4:
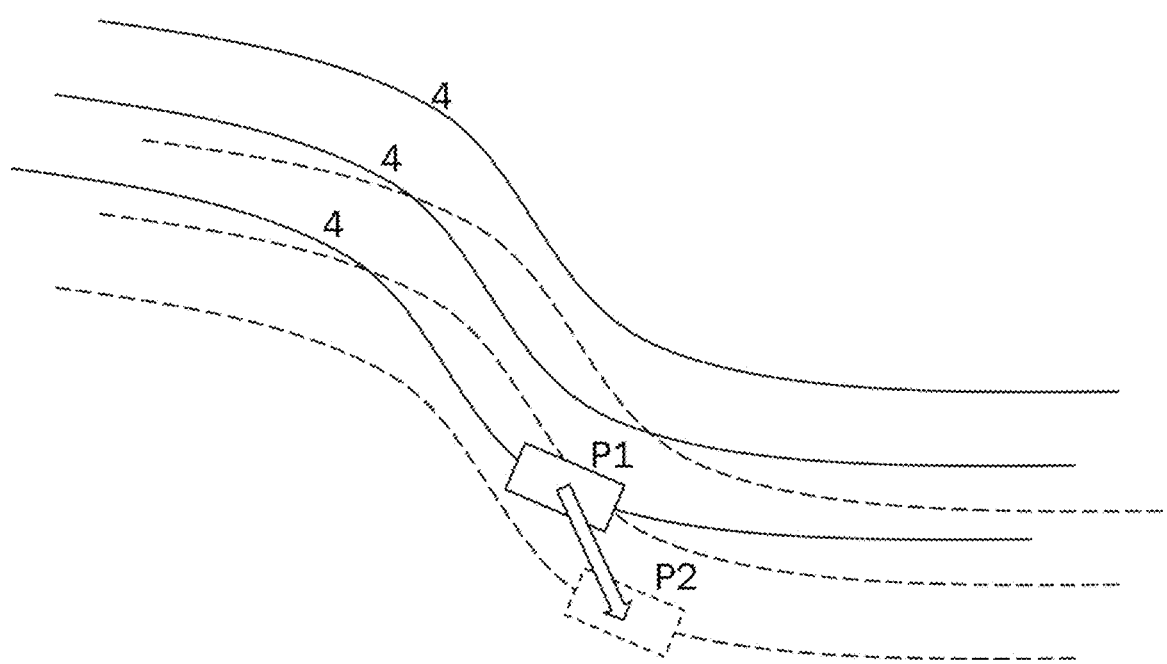
FIG. 4 schematically illustrates a second example of detecting localization objects for localizing a vehicle.

Examples of the process of detecting localization objects 4 are illustrated in FIGS. 3 and 4. In FIG. 3 a plurality of localization objects 4 is detected. For each localization object 4 a position illustrated by the solid squares is detected. This information is sent to the server 3 as part of the first position data P1. By matching the positions of the localization objects 4 with the HD map, a precise location for each localization object 4 can be obtained, which is illustrated by the dotted squares in FIG. 3. Using the correct locations of the plurality of localization objects 4, the accurate location of the vehicle 2 can be obtained as second position data P2 illustrated by the dotted circle in FIG. 3. As illustrated in FIG. 3, not only the location of the vehicle 2 is corrected, but also the uncertainty of the location is greatly reduced.

In a similar way, road surface markings may be used as localization objects 4 to localize the vehicle 2 as illustrated in FIG. 4. Road markings are used for example to mark lanes of a road. The markings are often provided as continuous or broken white or yellow lines. Detecting such road markings using optical detectors such as cameras or LiDAR can provide sufficient information for localizing the vehicle 2. For example, the first position data P1 may comprise information related to the detected road markings. The server 3 receives the first position data P1 and matches the information related to the road markings with the information about road markings contained in the HD map. As illustrated by FIG. 4, the correct location of the vehicle can be determined by correcting the position of the detected road markings (solid lines) with the correct locations of the markings comprised in the HD map (broken lines). Using this information, the second position data P2 can be calculated in order to determine the correct location of the vehicle 2 at the first point in time T1.

The localization objects 4 are detected for a specified point in time, for example the first point in time T1 associated with the first position data P1. In an alternative embodiment, the localization objects 4 may be detected over a predefined time interval. In the latter case, the detected positions of the localization objects 4 need to be compensated in accordance with the motion of the vehicle 2 during the predefined time interval of detection. The motion of the vehicle 2 may be derived from recorded operational parameters of the vehicle 2 obtained by a plurality of sensors, such as: an accelerometer, an odometer, a tachometer, a speedometer, a wheel speed sensor, a sensor for measuring a steering angle, a sensor for measuring a heading indicator (such as a gyroscope), and/or a compass. As a result, a plurality of coordinates of localization objects 4 with respect to a local coordinate system of the vehicle 2 are stored by the localization unit. These coordinates may be transmitted to the server as part of the first position data P1.

However, due to the inaccuracy of the first position data, the accuracy of the detected locations of the localization objects 4 is even lower. In particular, the uncertainty of the position (coordinates) of the localization objects 4 can be obtained by adding up the uncertainty of the vehicle's position and the uncertainty of the detection which is determined for example by the sensors. The first position data P1 transmitted to the server may thus comprise the coordinates of the localization objects 4 together with the associated uncertainties of the coordinates and the time stamps associated with the coordinates.

The server 3 evaluates the first position data P1 comprising the inaccurate position of the vehicle 2 and the coordinates of the localization objects 4 and executes a map matching algorithm, which may be based for example on an iterative closest point (ICP) algorithm.

This means that objects comprised in the HD map are associated with the detected localization objects 4 and a position of the vehicle is calculated, by minimizing the distance between the coordinates of the detected localization objects 4 and the associated objects of the HD map.

As a result, the second position data P2 is obtained. This second position data P2 is a very accurate position of the vehicle 2 at the first point in time T1. The second position data P2 is then transmitted to the vehicle 2.

Between the step of transmitting the first position data P1 from the vehicle 2 to the server 3 and receiving the second position data P2 by the vehicle 2 from the server, an amount of time has passed. This time delay may be smaller than a second, however, if the vehicle 2 is moving, the received location according to the second position data P2 is not the actual position of the vehicle 2. Thus, the localization unit of the vehicle 2 needs to derive the actual location by computing third position data P3. The third position data P3 describes the present location of the vehicle 2 at a second point in time T2 (present time). The third position data P3 may be calculated for example by applying the recorded operational parameters of the vehicle 2 to the second position data P2.

Even though using the recorded operational parameters of the vehicle 2 to derive the present location may increase the uncertainty of the third position data P3 with regard to the second position data P2, a much better accuracy can be obtained for the third position data P3 than in a case where the third position data P3 is derived from the first position data P1 which has a much higher uncertainty than the second position data P2.

By applying the method described above repeatedly after a given time interval of about thirty seconds, a high position accuracy can be maintained. In a case that a network error (i.e. a communication problem with the server 3) should occur, time-outs need to be handled accordingly. For example, depending on the time delay caused by the time-out, a new iteration may be initiated, or the calculation of the third position data P3 may take into account the longer delay time.

Since the computation of the exact location of the vehicle 2 is executed on the server 3, it is possible to perform the map matching using an up-to-date HD map which can be regularly or continuously updated. Furthermore, when using the HD map of the server 3, it is not necessary to locally store the HD map or parts thereof in the vehicle 2. This way, it can be avoided to transfer large amounts of data to vehicle 2 or to provide the vehicle with a storage unit having a high capacity. Moreover, computing the high-accuracy second position data P2 involves a high computational effort. The required processing effort and associated processing time is outsourced from the vehicle 2 to the server 3. Thus, local resources, for example of the second processing unit, are not required for the process of calculating the second position data P2, but can be used instead for calculating the third position data P3. Thus, by separating the tasks between the vehicle 2 and server 3, a very efficient localization system 1 can be achieved. Since the amount of data exchanged between the vehicle 2 and the server 3 is relatively small, communication networks with a low bandwidth are sufficient, and thus, the cost associated with the data traffic and the required technical components is low.

Figure 5:
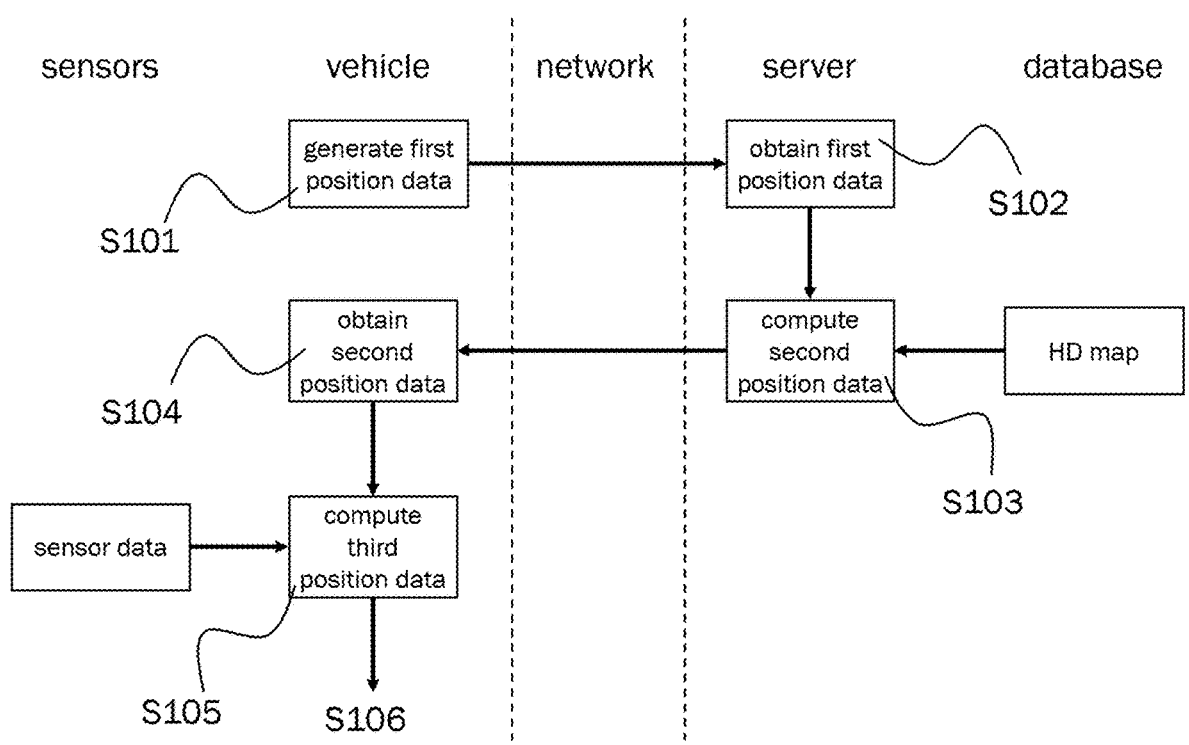
FIG. 5 shows a flow chart schematically illustrating a method for localizing a vehicle according to an embodiment

The method described above with reference to FIG. 5 is illustrated again using the flow chart of FIG. 5. The steps S101 to S106 are either carried out by the vehicle 2 (left side of FIG. 5) or by the server 3 (right side of FIG. 5) or relate to data transmission between vehicle 2 and server 3 via a network (center of FIG. 5). In a first step SI OI the vehicle generates first position data P1. As described before, the first position data P1 can be generated using a plurality of sensors. In a second step S102, the second communication unit of the vehicle 2 transmits the first position data P1 from the vehicle 2 to the server 3.

In step S103, the first communication unit of the server 3 obtains the first position data P1. Next, in step S103, the first processing unit of the server 3 computes second position data P2 related to the first position of the vehicle 2 at the first point in time T1 based on the first position data P1 and using data from an HD map obtained from a database. For example, the second position data P2 may be calculated by applying an algorithm for matching detected positions P12 of localization objects 4 comprised in the first position data P1 with the HD map.

Then, in step S105, the first communication unit of the server 3 transmits the second position data P2 to the vehicle 2 and the second communication unit of the vehicle 2 obtains the second position data P2 in step S106. The second processing unit of the vehicle 2 may then compute third position data P3 related to a current position of the vehicle 2 at a second point in time T2 based on the second position data P2 (step S107). For this purpose, the second processing unit may utilize sensor data obtained from the localization unit which receives sensor signals from an accelerometer, a gyroscope, and wheel speed sensor. Furthermore, the localization unit may comprise position sensors for generating sensor data P12 by detecting a plurality of localization objects 4 such as pylons, traffic signs, guiderails, lane markings on the road and/or buildings around the vehicle 2.

The entire process may be restarted at step S101 using the third position data P3 as first position data. Alternatively, the second processing unit of the vehicle may continue to calculate the location of the vehicle 2 as in step S106 but using the third position data P3 and the sensor data as input, thereby computing fourth position data P4 related to athird position of the vehicle at a third point in time T3 as illustrated for example in FIG. 2.

The features described in herein can be relevant to the invention in any combination. The reference numerals in the claims have merely been introduced to facilitate reading of the claims. They are by no means meant to be limiting.

Throughout this specification various embodiments have been discussed. However, it should be understood that the invention is not limited to any one of these. It is therefore intended that the foregoing detailed description be regarded as illustrative rather than limiting.

The above discussion is meant to be illustrative of the principles and various embodiments of the present disclosure. Numerous variations and modifications will become apparent to those skilled in the art once the above disclosure is fully appreciated.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. The term "processor" should be understood as encompassing any of the foregoing hardware, either singly or in combination. The terms "signal" and "data" are used interchangeably.

For example, one or more embodiments can include any of the following: packaged functional hardware unit designed for use with other components, a set of instructions executable by a controller (e.g., a processor executing software or firmware), processing circuitry configured to perform a particular function, and a self-contained hardware or software component that interfaces with a larger system, an application specific integrated circuit (ASIC), a Field Programmable Gate Array (FPGA), a circuit, digital logic circuit, an analog circuit, a combination of discrete circuits, gates, and other types of hardware or combination thereof, and memory that stores instructions executable by a controller to implement a feature.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

REFERENCE NUMERALS 1 system
2 vehicle
3 server
4 localization object

What is claimed is:

1. A method for an autonomous driving vehicle, the method comprising:
transmitting first position data corresponding to a first position of the vehicle at a first time from the vehicle to a server, an uncertainty of the first position data determined as insufficient for autonomous driving;

receiving second position data corresponding to the first position of the vehicle at the first time from the server, the second position data determined based on the first position data, an uncertainty of the second position data determined as sufficient for autonomous driving;

determining third position data corresponding a second position of the vehicle at a second time based on the received second position data, wherein the second time is subsequent to the first time;

determining that at least an uncertainty of the second position of the vehicle exceeds a first threshold or a time interval since the second position of the vehicle was last updated exceeds a second threshold, transmitting fourth position data corresponding to a third position of the vehicle at a third time from the vehicle to the server;

receiving fifth position data corresponding to the third position of the vehicle at the third time from the server, the fifth position data determined based on the fourth position data, an uncertainty of the third position smaller than the uncertainty of the second position;

determining sixth position data corresponding to a fourth position of the vehicle at a fourth time based on the received fifth position data, wherein the fourth time is subsequent to the third time.

2. The method of claim 1, wherein the second position data is determined based on a high-definition (HD) map.

3. The method of claim 1, further comprising determining the first position data based on at least one of position data received from a global navigation satellite system (GNSS) and sensor data obtained from sensors detecting a plurality of localization objects around the vehicle.

4. The method of claim 1, wherein the first position data comprises uncertainty information corresponding to an uncertainty of the first position of the vehicle at the first time.

5. The method of claim 1, wherein the third position data is determined based on a motion of the vehicle between the first time and the second time.

6. The method of claim 1, wherein determining at least the second position data and the third position data occurs at predetermined, recurring time intervals.

7. The method of claim 1, further comprising determining a time delay between transmitting the first position data and receiving the second position data wherein the third position data is further determined based on the determined time delay.

8. The method of claim 1, further comprising recording operational parameters of the vehicle, wherein operational parameters recorded after transmitting the first position data are used to determine the third position data.

9. The method of claim 1, further comprising:
determining that the vehicle has not moved between the first time and the second time; and
adopting the second position data as the third position data.

10. An autonomous driving vehicle, the vehicle comprising:
a first communication unit for transmitting and receiving position data from and to the vehicle; and
a positioning device, the positioning device comprising:
a localization unit for determining the position data; and
a processing unit for computing the position data, wherein the processing unit is configured for:

causing the localization unit to determine first position data corresponding to a first position of the vehicle at a first time;

causing the communication unit to transmit the first position data from the vehicle to a server, an uncertainty of the first data determined as insufficient for autonomous driving;

causing the communication unit to receive second position data corresponding to the first position of the vehicle at the first time from the server, the second position data determined based on the first position data, an uncertainty of the second position data determined as sufficient for autonomous driving;

determining third position data corresponding a second position of the vehicle at a second based on the received second position data, wherein the second time is subsequent to the first time, determining that at least an uncertainty of the second position of the vehicle exceeds a first threshold or a time interval since the second position of the vehicle was last updated exceeds a second threshold;

causing the communication unit to transmit fourth position data corresponding to a third position of the vehicle at a third time from the vehicle to the server, causing the communication unit to receive fifth position data corresponding to the third position of the vehicle at the third time from the server, the fifth position data determined based on the fourth position data, an uncertainty of the third position smaller than the uncertainty of the second position, causing the localization unit to determine sixth position data corresponding a fourth position of the vehicle at a fourth time based on the received first position data, wherein the fourth time is subsequent to the third time.

11. The autonomous driving vehicle of claim 10, wherein the localization unit includes a GPS receiver for receiving position data from a global navigation satellite system (GNSS) and at least one position sensor for obtaining sensor data by detecting a plurality of localization objects around the vehicle.

12. The autonomous driving vehicle of claim 11, wherein the at least one position sensor includes at least one of: a radar sensor, an infrared sensor, a stereo-camera, a LiDAR sensor, and a laser sensor.

13. The autonomous driving vehicle of claim 11, wherein the localization unit further includes a storage unit for recording operational parameters obtained by the at least one position sensor.

14. The autonomous driving vehicle of claim 10, wherein the vehicle further comprised a control device configured for steering and navigating a trajectory of the vehicle based on at least the third position data.

15. The autonomous driving vehicle of claim 10, wherein the processing unit is further configured for determining a time delay between transmitting the first position data and receiving the second position data, wherein the third position data is further determined based on the determined time delay.

16. The autonomous driving vehicle of claim 10, wherein the processing unit is configured for:
determining that the vehicle has not moved between the first time and the second time; and
adopting the second position data as the third position data.

17. An autonomous driving vehicle, the vehicle comprising:
a processor; and a memory including instructions that, when executed by the processor, cause the processor to:

communicate, to a computing device remotely located from the vehicle, first position data corresponding to a first position of the vehicle at a first time, an uncertainty of the first position data determined as insufficient for autonomous driving;

receive, from the computing device, second position data corresponding to the first position of the vehicle at the first time, the second position data determined based on the first position data, an uncertainty of the second position data determined as sufficient for autonomous driving;

determine third position data corresponding to a second position of the vehicle at a second time based on the received second position data, wherein the second time is subsequent to the first time:

determine that at least an uncertainty of the second position of the vehicle exceeds a first threshold or a time interval since the second position of the vehicle was last updated exceeds a second threshold, communicate, to the computing device, fourth position data corresponding to a third position of the vehicle at a third time from the vehicle to the computing device;

receive, from the computing device, fifth position data corresponding to the third position of the vehicle at the third time, the fifth position data determined based on the fourth position data, an uncertainty of the third position smaller than the uncertainty of the second position;

determine sixth position data corresponding to a fourth position of the vehicle at a fourth time based on the received fifth position data, wherein the fourth time is subsequent to the third time.

18. The autonomous driving vehicle of claim 17, wherein the instructions further cause the processor to determine the first position data based on position data received from at least one sensor.

19. The autonomous driving vehicle claim 17, wherein the first position data includes uncertainty information corresponding to an uncertainty of the first position of the vehicle at the first time.

20. The autonomous driving vehicle claim 17, wherein the instructions further cause the processor to determine the third position data using a motion of the vehicle between the first time and the second time.

* * * * *